US009576374B2

(12) United States Patent
Elkington et al.

(10) Patent No.: US 9,576,374 B2
(45) Date of Patent: Feb. 21, 2017

(54) METHODS OF AND APPARATUSES FOR IDENTIFYING GEOLOGICAL CHARACTERISTICS IN BOREHOLES

(71) Applicant: REEVES WIRELINE TECHNOLOGIES LIMITED, Leicestershire (GB)

(72) Inventors: Peter Adrian Spencer Elkington, Loughborough (GB); Said Assous, Nottingham (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 0 days.

(21) Appl. No.: 14/873,698

(22) Filed: Oct. 2, 2015

(65) Prior Publication Data

US 2016/0027185 A1    Jan. 28, 2016

Related U.S. Application Data

(62) Division of application No. 13/894,029, filed on May 14, 2013.

(30) Foreign Application Priority Data

Mar. 11, 2013   (GB) .................................. 1304304.7

(51) Int. Cl.
  *G06K 9/00*   (2006.01)
  *G06T 7/00*   (2006.01)
  (Continued)

(52) U.S. Cl.
  CPC ............... *G06T 7/0085* (2013.01); *G01V 1/40* (2013.01); *G01V 1/42* (2013.01); *G01V 3/20* (2013.01);
  (Continued)

(58) Field of Classification Search
  CPC combination set(s) only.
  See application file for complete search history.

(56) References Cited

U.S. PATENT DOCUMENTS

| 2,021,223 | A | 11/1935 | Church |
| 4,001,773 | A | 1/1977 | Lamel et al. |
(Continued)

FOREIGN PATENT DOCUMENTS

| EP | 2105866 A1 | 9/2009 |
| WO | 2007010206 A1 | 1/2007 |
(Continued)

OTHER PUBLICATIONS

Kovesi, P. ("Image features from phase congruency," Kovesi P, Videre: Department of Computer Science,The University of Western Australia Nedlands, W.A. 6009, abstract page and pp. 1-30 will be referred to as Koveski) (provided by applicant).*

(Continued)

*Primary Examiner* — Anand Bhatnagar
(74) *Attorney, Agent, or Firm* — Blank Rome LLP

(57) ABSTRACT

A method of detecting an edge of a geological characteristic in a borehole comprises, in respect of an image log of a length of a borehole, carrying out the steps of a gradient-based edge detection method, a phase congruence-based edge detection method or a combination of such methods as preliminary, pre-processing stages. Subsequent steps of the method may include operating a relatively computationally simple process to identify sinusoids among detected edge features; and a relatively computationally complex process for parameterizing the thus-identified sinusoids.

16 Claims, 16 Drawing Sheets

(51) Int. Cl.

| | | |
|---|---|---|
| G01V 11/00 | (2006.01) | |
| G01V 1/42 | (2006.01) | |
| G01V 3/24 | (2006.01) | |
| G01V 3/38 | (2006.01) | |
| G01V 1/40 | (2006.01) | |
| G01V 3/20 | (2006.01) | |

(52) U.S. Cl.
CPC . *G01V 3/24* (2013.01); *G01V 3/38* (2013.01); *G01V 11/00* (2013.01); *G01V 2210/6169* (2013.01); *G06T 2207/10132* (2013.01); *G06T 2207/20056* (2013.01)

(56) References Cited

U.S. PATENT DOCUMENTS

| | | | |
|---|---|---|---|
| 4,399,873 A | 8/1983 | Lindsey | |
| 4,780,857 A | 10/1988 | Lyle et al. | |
| 4,885,723 A * | 12/1989 | Havira | G01V 1/46 181/105 |
| 5,162,994 A | 11/1992 | Torres | |
| 5,257,101 A * | 10/1993 | Lee | B27B 1/007 348/552 |
| 5,678,635 A | 10/1997 | Dunlap et al. | |
| 5,899,958 A * | 5/1999 | Dowell | E21B 47/0002 175/50 |
| 6,226,454 B1 * | 5/2001 | Couture | B64F 5/0072 250/495.1 |
| 6,226,595 B1 | 5/2001 | Rossi et al. | |
| 7,254,486 B2 | 8/2007 | Guo | |
| 7,705,878 B2 * | 4/2010 | Mandal | H04N 7/183 348/85 |
| 2003/0226668 A1 | 12/2003 | Zimmerman et al. | |
| 2006/0229815 A1 * | 10/2006 | Guo | G01V 5/06 702/8 |
| 2007/0122025 A1 | 5/2007 | Christian et al. | |
| 2007/0189580 A1 * | 8/2007 | Slabaugh | G06K 9/6207 382/103 |
| 2008/0179060 A1 | 7/2008 | Surjaatmadja et al. | |
| 2009/0123070 A1 | 5/2009 | Xiaoying | |
| 2009/0141943 A1 | 6/2009 | Liu | |
| 2009/0262603 A1 * | 10/2009 | Hurley | G01V 11/00 367/86 |
| 2010/0161232 A1 | 6/2010 | Chen et al. | |
| 2011/0091078 A1 * | 4/2011 | Kherroubi | G01V 11/00 382/109 |
| 2013/0170713 A1 * | 7/2013 | Kumar | E21B 47/022 382/109 |
| 2013/0336541 A1 | 12/2013 | Elkington et al. | |
| 2014/0286539 A1 | 9/2014 | Shetty et al. | |

FOREIGN PATENT DOCUMENTS

| | | |
|---|---|---|
| WO | 2008042934 A1 | 4/2008 |
| WO | 2009/126881 A2 | 10/2009 |
| WO | 2009/126888 A2 | 10/2009 |
| WO | 2010083761 A1 | 7/2010 |

OTHER PUBLICATIONS

Venkatesh, S., "On the clasification of image features," Pattern Recognition Letters 11 (1990) 339-349, May 1990.
Heeger, D. J., "Optical Flow from Spatiotemporal Filters," In Proceedings, 1st International Conference on Computer Vision, pp. 181-190, Jun. 1987.
Wang, Z. et al., "Using complex Gabor filters to detect and localize edges and bars," Advances in Machine Vision: Strategies and Applications, Chapter: 8, Publisher: World Scientific Press, Editors: Colin Archibald and Emil Petriu, pp. 151-170, 1992.
Search Report received in Great Britain application No. GB1304304.7 dated Sep. 5, 2013, 5 pages.
Search Report received in corresponding Great Britain Application No. GB1304304.7, dated Mar. 14, 2014, claims 8-20.
"An Implementation of the Hough Transformation for the Identification and Labelling of Fixed Period Sinusoidal Curves," Glossop K; Lisboa PJG; Russell PC; Siddans A; Jones GR, Computer Vision and Image Understanding, US, 1991, vol. 74, pp. 96-100.
"Edge Detection Revisited," Pellegrino FA; Torre V; Vanzella W, IEEE Transactions on Systems, Man and Cybernetics, Part B: Cybernetics, NJ, US, Jan. 6, 2004, vol. 34, pp. 1500-1518.
"Image features from phase congruency," Kovesi P, Videre: Journal of Computer Vision Research, Massachusetts Institute of Technology, US, Jun. 21, 1999, vol. 1, pp. 2-6, Kovesi P. (Image Features from Phase Congruency, Dept. of computer science, The University of Western Australia Nedlands, W.A. 6009.
Search Report received in corresponding Great Britain Application No. GB1304304.7, dated Mar. 14, 2014, claims 21-34.
Lim, J, Two-Dimensional Signal and Image Processing, Englewood Cliffs, NJ, Prentice Hall, 1990, pp. 478-488.
Grossman, A. "Wavelet transforms and edge detection." Stochastic Processes in Physics and Engineering, pp. 149-157, D. Reidel Publishing Company, 1988.
European Search Report in counterpart EP Appl. 16154330.1, dated Jul. 1, 2016.
European Search Report in counterpart EP Appl. 16154337.6, dated Jul. 1, 2016.
Morrone, M. C., et al., "Feature detection from local energy," Pattern Recognition Letters, 6:303-313, 1987.
Lindeberg, T., "Edge Detection and Ridge Detection with Automatic Scale Selection," International Journal of Computer Vision archive, vol. 30 issue 2, Nov. 1998, pp. 117-156.
Heeger, D. J., "Optical flow using spatiotemporal filters. International Journal of Computer Visition," 1:279-302, 1988.
Heeger, D. J., "Normalization of cell responses in cat striate cortex," Visual Neuroscience, 9:181-197, 1992.
Adelson, E. H. et al., "Spatiotemporal energy models for the perception of motion." Journal of the Optical Society of America A, 2(2): 284-299, 1985.
Lindeberg,T., "Scale-space theory: A basic tool for analysing structures at different scales," Journal of Applied Statistics, 21(2): 225-270, 1994.
Lindeberg, T., "Discrete derivative approximations with scale-space properties: A basis for low-level feature axtraction," J. of Mathematical Imaging and Vision, 3(4): 349-376, Now. 1993.

\* cited by examiner

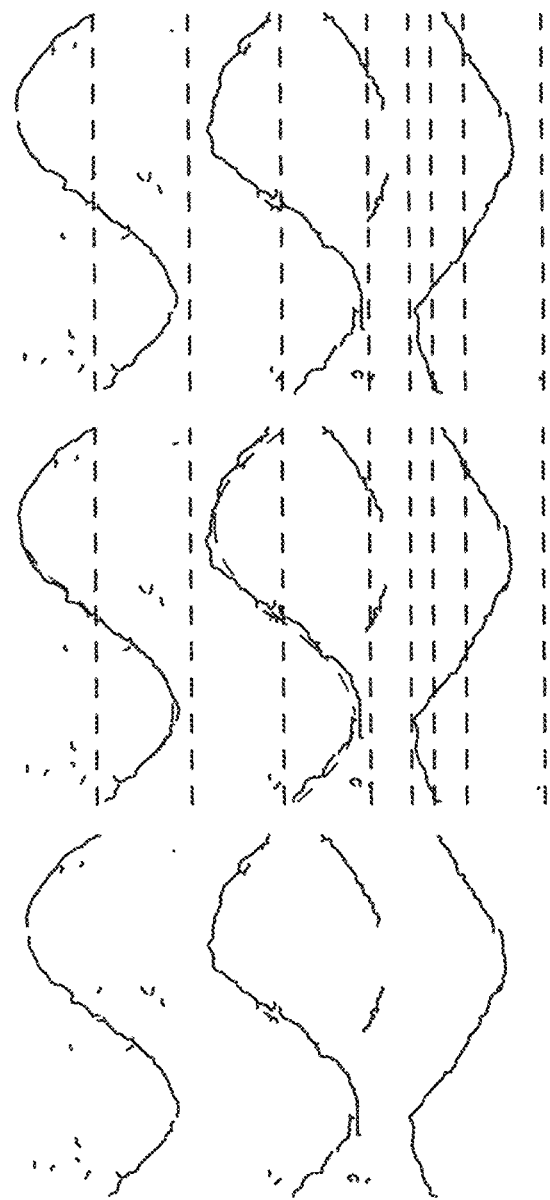

METHODS OF AND APPARATUSES FOR IDENTIFYING GEOLOGICAL CHARACTERISTICS IN BOREHOLES

CROSS-REFERENCE TO RELATED APPLICATIONS

This application is a divisional of U.S. application Ser. No. 13/894,029, filed 14 May 2013, which is incorporated herein by reference and which claims the benefit under 35 U.S.C. §119(a) to U.K. Appl. No. GB 1304304.7, filed 11 Mar. 2013.

FIELD OF THE DISCLOSURE

The invention relates to methods of and apparatus for identifying geological characteristics in boreholes.

BACKGROUND OF THE DISCLOSURE

A geological formation may be penetrated by a borehole for the purpose of assessing the nature of, or extracting, a commodity of commercial value that is contained in some way in the formation. Examples of such commodities include but are not limited to oils, flammable gases, tar/tar sands, various minerals, coal or other solid fuels, and water.

When considering the assessment and/or extraction of such materials the logging of geological formations is, as is well known, economically an extremely important activity.

Virtually all commodities used by mankind are either farmed on the one hand or are mined or otherwise extracted from the ground on the other, with the extraction of materials from the ground providing by far the greater proportion of the goods used by humans.

It is extremely important for an entity wishing to extract materials from beneath the ground to have as good an understanding as possible of the conditions prevailing in a region from which extraction is to take place.

This is desirable partly so that an assessment can be made of the quantity and quality, and hence the value, of the materials in question; and also because it is important to know whether the extraction of such materials is likely to be problematic.

The acquisition of such data typically makes use of techniques of well or borehole logging. Logging techniques are employed throughout various mining industries, and also in particular in the oil and gas industries. The invention is of benefit in well and borehole logging activities potentially in all kinds of mining and especially in the logging of reserves of oil and gas.

In the logging of oil and gas fields (or indeed geological formations containing other fluids) specific problems can arise. Broadly stated this is because it is necessary to consider a geological formation that typically is porous and that may contain a hydrocarbon-containing fluid such as oil or natural gas or (commonly) a mixture of fluids only one component of which is of commercial value.

This leads to various complications associated with determining physical and chemical attributes of the oil or gas field in question. In consequence a wide variety of well logging methods has been developed over the years. The logging techniques exploit physical and chemical properties of a formation usually through the use of a logging tool or sonde that is lowered into a borehole formed in the formation by drilling.

Broadly, in most cases the tool sends energy into the formation and detects the energy returned to it that has been altered in some way by the formation. The nature of any such alteration can be processed into electrical signals that are then used to generate logs (i.e. graphical or tabular representations, or datasets, containing much data about the formation in question).

An example of a logging tool type is the so-called multi-pad micro-resistivity borehole imaging tool, such as the tool 10 illustrated in transversely sectioned view in FIG. 1. In this logging tool a circular array of (in the example illustrated) eight pads 11 each in turn supporting typically two lines of surface-mounted resistivity electrodes referred to as "buttons" 12 is supported on a series of caliper arms 13 emanating from a central cylinder 14. During use of the tool 10 the arms 13 press the buttons 12 into contact with the very approximately cylindrical wall of a borehole. The borehole is normally filled with a fluid (such as a water-based mud) that if conductive provides an electrical conduction path from the formation surrounding the borehole to the buttons.

Many variants on the basic imaging tool design shown are known. In some more or fewer of the pads 11 may be present. The numbers and patterns of the buttons 12 may vary and the support arms also may be of differing designs in order to achieve particular performance effects. Sometimes the designers of the tools aim to create e.g. two parallel rows of buttons located on the pad one above the other in use. The buttons in the lower row are offset slightly to one side relative to their counterparts in the row above. When the signals generated by the buttons are processed the outputs of the two rows of buttons are in effect lain over one another. As a result the circumferential portion of the borehole over which the buttons 12 of a pad 11 extend is logged as though there exists a single, continuous, elongate electrode extending over the length in question.

Another type of resistivity logging tool is employed during so-called logging while drilling (LWD) operations. This logging tool may include only a single button.

In general in operation of a tool such as resistivity tool 10 electrical current generated by electronic components contained within the cylinder 14 spreads into the rock and passes through it before returning to the pads 11. The returning current induces electrical signals in the buttons 12.

Changes in the current after passing through the rock may be used to generate measures of the resistivity or conductivity of the rock. The resistivity data may be processed according to known techniques in order to create (typically colored) image logs that reflect the composition of the solid and fluid parts of the rock. These image logs convey much data to geologists and others having the task of visually inspecting and computationally analyzing them in order to obtain information about the subterranean formations.

In use of a tool such as that shown in FIG. 1 the tool is initially conveyed to a chosen depth in the borehole before logging operations commence. The deployed location may be many thousands or tens of thousands of feet typically but not necessarily below, and in any event separated by the rock of the formation from, a surface location at which the borehole terminates.

Various means for deploying the tools are well known in the mining and oil and gas industries. One characteristic of many of them is that they can cause a logging tool that has been deployed as aforesaid to be drawn from the deployed location deep in the borehole back towards the surface location. During such movement of the tool it logs the formation, usually continuously. As a result the image logs may extend continuously for great distances.

Generally the logging tool is conveyed to the depth at which logging commences supported on wireline, i.e.

strengthened cable that is capable of both supporting the mass of the logging toolstring (that may be several tens or even hundreds of kilograms) and conveying electrical signals between the logging tool and a surface location. Thus the functions of wireline, that are in themselves well known in the logging art, include suspending the logging tool while it is being deployed for use; withdrawing the tool towards a surface location during use; transmitting electrical or electronic commands to the toolstring to effect chosen operations; and telemetering data, from which the logs are constructed, from the tool to the surface location while logging occurs.

Other designs of logging tool are autonomous in the sense of not being permanently connected to a surface location by wireline. Such tools include on-board power sources and memory devices. As a result they can be conveyed to downhole locations for example shielded within drillpipe and then exposed at the end of a length of drillpipe so as to log a formation surrounding the borehole while the drillpipe is withdrawn to a surface location. Such types of logging tool do not telemeter data in real time and instead store it in the on-board memory devices for downloading after retrieval of the logging tool to a surface location.

SUMMARY OF THE DISCLOSURE

The invention is of utility in relation to all the types of imaging tool outlined above.

Furthermore the invention is of benefit in the processing of image logs that instead of being generated by an electrical (resistivity) logging tool are generated by an acoustic device, or by combinations of resistivity and acoustic devices. The characteristics of image logs produced by acoustic logging tools are sufficiently similar to those of resistivity image logs as to permit this. For economy herein however the remainder of this document refers chiefly to logs produced using resistivity image logging tools notwithstanding the applicability of the methods of the invention to image log data produced using acoustic logging tools.

One characteristic of image logs is that notwithstanding in some tool designs a large number of buttons of the type described above the logs are discontinuous in the direction around the borehole. This is because deployment of the arms on which the pads are supported gives rise to gaps between the pad ends at which no log data can be recorded. Also, as noted, in some logging tool designs very few buttons indeed are present.

The inventors have devised a number of advanced techniques for filling in such gaps in the coverage of imaging tools. Following processing of an image log to compensate for discontinuities of the kind described, or sometimes in cases in which no filling in of this kind takes place, an aspect of particular interest to log analysts and geoscientists is the correct identification of sinusoids.

Sinusoids are often of very considerable significance because a plane that is intersected by a borehole at any orientation other than orthogonally produces a sinusoidal pattern in an image log. This is because, as is well known in geometry, a plane intersecting a hollow cylinder produces a sinusoid in the rendering of the cylinder as a two-dimensional sheet. Such rendering in essence is part of the process of producing a graphical image log, in which the three-dimensional borehole is portrayed by way of a two-dimensional (usually rectangular) image.

Geological features such as fractures and layer edges, that are important when assessing for example the boundaries of a productive part of a subterranean formation or potential problems in removing valuable material to a surface location, frequently give rise to sinusoids. The correct identification of sinusoids therefore is very important when analyzing image logs.

Hitherto the most common method of identifying sinusoids has involved the displaying of colored images of the logs and human assessment, by eye, of the visible features.

Humans are good at visually interpreting patterns so the recognition of sinusoids in this fashion can be achieved with acceptable reliability. Any process of inspecting a log, that as indicated might extend for hundreds or thousands of feet, however is very time-consuming. This is partly because the length of the log may simply make this a lengthy process. Also there may be a very large number of sinusoids, or potential sinusoids, to assess.

Aside from the fact that log analysis time is expensive in some situations the rapid identification of geological features may on occasion be of considerable economic or even safety-related importance.

Attempts have been made to automate the recognition of certain geological features in image logs, but these have been of limited utility in identifying sinusoids. One reason for this is that the sinusoids while usually readily recognizable to a human analyst are almost never perfect. On the contrary they are frequently distorted, interrupted and skewed.

Skewing and distortion arise in part because the boreholes in which logging takes place are rarely truly cylindrical. The rendering in a two-dimensional image of a plane that intersects a non-cylindrical figure is not a perfect sinusoid. Machine vision systems hitherto have been unreliable at recognizing such imperfect sinusoids.

Furthermore the creation of perfect sinusoids would depend on the logging tool being withdrawn towards an uphole location, during logging, at a constant speed. The fact that for a variety of reasons this does not often happen means that the vertical scale of the apparent sinusoid may vary from place to place. As a result the sinusoid often cannot be modeled by a single function as would be ideal for existing software-based recognition methods and equipment.

Yet a further problem is that image logs can be very "noisy" in terms of spurious image features and similar defects.

Other causes of imperfection are also known to log analysts and geologists.

The invention is of utility in relation to all the types of imaging tool outlined above. Furthermore the invention is of benefit in the processing of image logs that instead of being generated by an electrical (resistivity) logging tool are generated by an acoustic device, or by combinations of resistivity and acoustic devices. The characteristics of image logs produced by acoustic logging tools are sufficiently similar to those of resistivity image logs as to permit this. For economy herein however the remainder of this document refers chiefly to logs produced using resistivity image logging tools notwithstanding the applicability of the methods of the invention to image log data produced using acoustic logging tools.

An aim of the invention is to improve the extent to which automated or machine-driven sinusoid assessments in image logs can be completed.

The inventors have developed improved machine recognition regimes, methods and apparatuses, as defined herein, for identifying sinusoids in image logs. The inventors furthermore have recognized that the improved machine techniques they have developed are themselves more effective if the image log data are pre-processed before the improved image recognition techniques are applied.

The inventors have discovered that a gradient-based approach is successful as such a pre-processing step. To this end in a first aspect of the invention there is provided a method of detecting an edge of a geological characteristic in a borehole comprising, in respect of an image log of a length of a borehole, carrying out the steps of a gradient-based edge detection method.

More specifically the gradient-based edge detection method is a differential geometric multi-scale method.

This method optionally includes defining as a scale-space edge a set of connected points in a scale-space at which:
  a. the gradient magnitude assumes a local maximum in the gradient direction; and
  b. a normalized measure of the strength of the edge response is locally maximal over plural scales.

The gradient-based approach in essence seeks to identify and locate sharp or pronounced discontinuities in the image log, that manifest themselves as abrupt changes in pixel intensity.

Preferably the scale levels employed for detection of relatively sharper edges are finer than the scale levels employed for detection of relatively less sharp edges. This is an automatic consequence of the approach adopted of suppressing non-local maxima as described herein below.

In order to determine the fineness or coarseness of the scale applied, the method preferably includes calculating a diffuseness estimate at each of a plurality of points along the said edge. The method also optionally includes, as noted, suppressing non-local maxima.

As an adjunct or alternative to the gradient-based edge detection technique defined hereinabove the inventors additionally have established that a phase congruency approach also is a successful pre-processing method.

To this end therefore in a broad second aspect of the invention there is provided a method of detecting an edge of a geological characteristic in a borehole comprising the steps of, in respect of an image log of a length of a borehole, identifying locations at which the phase congruency of components of a signal representative of data constituting the log or part thereof is maximal; and, in respect of such locations, characterizing them as one or more edges of geological characteristics.

Thus the second broad aspect of the invention involves a further edge detection technique as outlined. One significant advantage of this aspect of the invention is that it reduces the number of features falsely identified as sinusoids, by eliminating from further consideration those that are not true edge features of the kind that characterize sinusoids in image logs.

The inventors have found that the use of phase congruency at specific locations is an extremely reliable way of identifying edges that are associated with sinusoids.

The inventors in particular have found that the phase congruency technique is especially beneficial when carried out on image log data that have been the subject of gradient-based pre-processing in accordance with the first aspect of the method of the invention. However the phase congruency technique defined herein can be carried out as an initial pre-processing technique or even as the sole pre-processing technique within the scope of the invention.

Preferably the method includes generating a plurality of Fourier transforms respectively corresponding to the said components; comparing phase information in the Fourier transforms corresponding to a plurality of locations in the image log; and at locations where the phase information converges or is the same, characterizing such locations as one or more edges of geological characteristics.

This aspect of the method of the invention takes advantage of the nature of a Fourier transform in permitting analysis of phase information without considering amplitude information. This makes the pre-processing steps of the method highly robust to noise in the image log data.

In more detail the method includes determining the phase congruency of the components of the said signal at a location x through operation of the Fourier series expansion function $$PC(x) = \max_{\bar{\phi}(x) \in [0, 2\pi]} \frac{\sum_n A_n \cos(\phi_n(x) - \bar{\phi}(x))}{\sum_n A_n}$$

wherein:
PC(x) is the phase congruency of the components at location x;
$A_n$ represents the amplitude of the Fourier transform of the nth said component; and
$\Phi_n(x)$ represents the local phase of the Fourier transform of the nth said component at location x and wherein the value of $\bar{\phi}(x)$ that maximises this function is the amplitude weighted mean local phase angle of all the Fourier transforms of the said components at location x, such that a locally maximal value of phase congruence occurs where the amplitude weighted variance of local phase angles, relative to the amplitude weighted local phase, is minimal.

This approach is computationally efficient and may be completed quickly in order to reduce the population of features in the image log requiring further treatment to identify them as sinusoids.

As an optional adjunct to the foregoing pre-processing steps the method of the invention includes searching for peaks in a local luminance energy function that is proportional to phase congruency in accordance with the relation:

$$E(x) = PC(x)\Sigma_n A_n,$$

whereby to obtain a measure of phase congruency that is independent of the amplitudes (which are contrast-invariant) of individual said Fourier transforms.

This approach to the identification of locations of maximal phase congruency is particularly suited to image logs in which luminance energy is readily measurable; and moreover is computationally simpler than the approach based on the Fourier series as set out above.

Preferably the local luminance energy function E(x) is defined for a one-dimensional luminance profile l(x) as $$E(x) = \sqrt{F^2(x) + H^2(x)}$$

wherein:
F(x) is the signal l(x) following removal of its DC component; and
H(x) is the Hilbert transform of F(x).

In this aspect of the method of the invention F(x) and H(x) preferably are approximated by convolving l(x) with a pair of quadrature filters. Quadrature filters are known per se in the context of visual perception modeling, but according to the inventors' understanding they have not hitherto been used in the determination of edges in image logs.

The techniques of non-local maxima suppression differ depending on whether the pre-processing is of the phase congruency type or the gradient determination type defined above.

In the case of phase-based image pre-processing preferably the non-local maxima suppression technique includes using an orientation image resulting from the steps hereof to generate feature-normal orientation angles in respect of edge features; employing a bi-linear interpolation algorithm to estimate image intensity values at real-value pixel locations on either side of selected pixels of the image log in order to determine whether the selected pixels are local maxima; and if not, suppressing the selected pixels.

Conveniently the method also includes performing hysteresis thresholding of the image log.

Preferably the hysteresis thresholding includes categorizing all first pixels having grey values resulting from practicing the steps of the second aspect of the invention less than a threshold T1 as representing edges; and categorizing all further pixels connected to the first pixels and having values greater than a threshold T2 also as representing edges. The use of grey values is a consequence of the phase domain processing. The output at this stage is a binary (0,1) image.

Preferably the method includes in respect of any square pattern of nine pixels (where the targeted pixel is in the center) categorized as representing edges, disregarding the value of the center pixel.

The method also optionally includes carrying out morphological cleaning of pixels by disregarding the values of pixels on the boundaries of objects based on a morphological component analysis of selected parts of the image.

If the method of determining the presence of edge features involves a gradient-based approach as set out herein the steps of non-local maxima suppression preferably involve the steps of applying a break to one or more non-monotonic bends in the image log; applying break branches to the result of applying breaks; and applying a cleaning filter to the resulting data.

The different processes carried out after gradient-based edge detection are, in more detail:
1. Removal of any vertical features resulting from problems of pad normalization, which could introduce unwanted vertical lines.
2. Application of a "Lindeberg" edge algorithm again as it provides well connected single pixel thick edges. The connectivity of the edges is very important as it enables a determination of how each edge or combination of more than one edge can be fitted by a sine wave. When the edges are broken into smaller parts, there is a very large number of possible combinations of these edge fragments which must be examined by the code to see how well they fit a sine wave.
3. Breaking of any edges that start to bend back on themselves in the x direction. Hence, all edges after this stage are "monotonic". This stage is required in cases where a single edge has been fitted to two separate sine curves in the data, and also serves to break up the background non sine wave edge content into shorter lengths that allows most of them to be removed in stage 5.
4. Removal of any pixels which are connected to more than two other pixels. This stage is required to ensure that all edges consist of single lines (i.e. there are no branches). This simplifies the processing and again addresses the case where an edge follows two separate sine curves.
5. Seeking to remove unwanted edges which are due to edge content in the background texture. This stage simplifies the processing and reduces the likelihood of false positives.

The steps of the method of the invention defined thus far amount to (relatively quickly performed) pre-processing activities, as noted. Once these are complete to the extent necessary depending on the kind of edge detection technique adopted the identification and, following identification, parameterizing of sinusoids becomes possible.

Estimating of sine waves therefore then occurs. A list of all of the edges found in the input image is first acquired. The algorithm then proceeds according to a third aspect of the invention in which a method of identifying sinusoidal geological characteristics in a borehole comprises the steps of, in respect of an image log of a length of a borehole, employing a relatively computationally simple technique for identifying the presence of sinusoids among detected edge features; and subsequently applying a relatively computationally complex technique for determining the parameters of sinusoids identified using the relatively computationally simple technique.

Each edge in the list which covers most of the width of the image (a threshold of 75% currently being preferred) is first considered. The sine wave parameters are estimated for this edge, and if the error is below the acceptance threshold, this sine wave is accepted. Otherwise, the edge is discarded.

For the avoidance of doubt the invention extends to a method as aforesaid when carried out on image log data processed in accordance with the methods hereof to isolate data representative of edge features.

In more detail the method of the invention includes searching for counterpart edge features in respective locations spaced approximately π radians apart in the image log.

This aspect of the method takes advantage of the character of a sine wave generated by intersection of a plane with a cylinder in repeating every 2π radians (360°). This means that every π radians (180°) except at the point of crossing its horizontal axis a sine wave is of equal magnitude and opposite sign.

Thus if a sinusoidal feature is detected at location x on the horizontal axis in a genuine sinusoid a counterpart feature of equal amplitude and opposite sign should exist at location $(x+\pi)^c$. A method that involves searching at such a location therefore is likely to be a reliable way of affirming whether likely sinusoid features indeed are parts of sinusoids.

However as noted the sinusoids encountered in image logs are always imperfect in the ways outlined hereinabove. It therefore is necessary to take account of the fact that the amplitude and shape of the sinusoid at $(x+\pi)^c$ is unlikely to be a precise mirror image of the waveform at location x.

To this end the method of the invention includes the further steps of:
a. processing the image log data on the basis of a sequential line-by-line approach in which each line in the image log is vertically spaced from at least one neighbor;
b. at each line analyzing a window of pixels above and below the line;
c. for each pixel position p1 in the window assessing whether the pixel contains part of an edge feature;
d. if the result of Step c is positive, identifying a further pixel position p2 shifted horizontally by W/2, where W is the image width, and reflected vertically about the said line; and
e. searching a region centered on p2 for further edge features.

In this context the concept of shifting the assessed pixel position by W/2 includes wrapping the pixel position in the event of the shift otherwise extending beyond the end of the extent of the image in a horizontal direction. Thus the W/2 shifted position is always somewhere in the image.

Preferably the step e. of searching a region centered on pixel position p2 includes, in respect of each edge feature detected, incrementing an accumulator relating to the said line; performing a threshold analysis on the value of the accumulator; and using the result of the threshold analysis to determine whether a sinusoid is present at the position of the line.

The method of the invention optionally includes repeating the steps of any hereof in respect of further lines of the image log.

The steps defined in the immediately preceding sections produce as an output the identities of candidate lines that can then be assessed using a more rigorous (and hence slower) process for determining the parameters of the sinusoids.

This more rigorous aspect of the method of the invention preferably includes:
   a. processing the image log data on the basis of a sequential line-by-line approach in which each line in the image log is vertically spaced from at least one neighbor;
   b. at each line analyzing a window of pixels above and below the line;
   c. for each pixel position p1 in the window assessing whether the pixel contains part of an edge feature;
   d. if the result of Step c is positive, determining the slope of the edge feature at the location p1;
   e. identifying a further pixel position p2 shifted horizontally by W/2, where W is the image width, and reflected vertically about the said line;
   f. determining the slope of any edge feature at or near position p2; and
   g. if the value of the slope at p2 is equal in magnitude and opposite in sign to that determined at position p1, incrementing an accumulator relating to the said line; performing a threshold analysis on the value of the accumulator; and using the result of the threshold analysis to determine whether a sinusoid is present at the position of the said line.

A method of parameterizing one or more sinusoids identified through practicing of the methods hereof includes the steps of:
   a. creating a two-dimensional accumulator space representing a range of values of A and $\phi$, being respectively the amplitude and phase angle of the sinusoid;
   b. analyzing each line of the image log that in accordance with the steps defined above has been identified as containing a sinusoid;
   c. for each said line, analyzing a window of pixels above and below the line and for each pixel position x, y within the window that contains an identified part of an edge feature, determining the local slope of the edge;
   d. for each said slope, determining estimates of A and $\phi$;
   e. incrementing the element of the accumulator that corresponds to the resulting, estimated values of A and $\phi$ so as to derive an accumulated count of different values of A and $\phi$;
   f. repeating steps a. to e. above in respect of the whole window and determining the maximum value in the accumulator space and, if it exceeds a threshold;
   g. selecting the values of A and $\phi$ corresponding to the accumulator element values that exceed the threshold as values of A and $\phi$ whereby to generate data and/or one or more signals representative of a parameterized sinusoid.

Preferably the step d. includes determining $\phi$ using the expression:

$$\phi = \tan^{-1}\left(\frac{2\pi y}{W\frac{dy}{dx}}\right) - \frac{2\pi x}{W}$$

Also preferably the step d. includes determining A using the expression:

$$A = \frac{y}{\sin\left(\frac{2\pi x}{W} + \phi\right)}$$

The foregoing expressions derive from the identity of sinusoids.

Preferred embodiments of the invention optionally include the steps of:
   a. for each non-zero element in the accumulator space, determining the corresponding values of A and $\phi$;
   b. setting a counter to zero;
   c. analyzing each pixel in the image log corresponding to the sinusoid specified by (i) the identity of the line under consideration and (ii) the values of A and $\phi$ associated with the said line;
   d. determining the slope angle of the sinusoid at each pixel position;
   e. for a search region centered on each pixel position, incrementing the counter by the number of pixels identified as relating to edge features the local slope angle of which lies within a threshold of the slope angle determined in step a.;
   f. repeating steps a. to e. in respect of all pixels identified as relating to edge features; and
   g. if the counter value exceeds a threshold, allocating the resulting values of A and $\phi$ as parameters of the sinusoid.

Parameterizing of the sinusoid in accordance with the foregoing steps allows it to be plotted, displayed and processed. Thus the method of the invention includes employing the sinusoid the parameters of which result from the foregoing method steps in further processing of the image log.

In more detail, such further processing may include one or more further steps selected from superimposing an image of the parameterized sinusoid onto the image log, printing the image log including a superimposed sinusoid, displaying the image log including a superimposed sinusoid, displaying or printing the parameterized sinusoid in the absence of other image log data and/or utilizing data and/or a signal representative of the parameterized sinusoid in one or more calculations based on data of the log image or of another log. The further processing also may include collating, displaying or operating on statistics such as the number of sinusoids in a log, sinusoid amplitudes and similar quanta.

The invention furthermore resides in a method of processing geological information including the steps of operating an image logging tool to energize a geological formation and thereby generate image log data; processing the image log data in accordance with any of the steps defined hereinabove; apparatus including one or more image logging tools and one or more programmable devices programmed to perform any of the method steps set out herein; and/or in log data produced in accordance with any such method step.

BRIEF DESCRIPTION OF THE DRAWINGS

There now follows a description of preferred embodiments of the invention, by way of non-limiting example, with reference being made to the accompanying representations in which:

FIGS. 12a-12c are, respectively, an extract of original data of an image log; a display of lines at which possible sine waves have been detected using the relatively fast sinusoid detection steps of the method of the invention; and the same image, including the estimated sine waves resulting from the parameterization process steps of the invention overlain on the candidate lines;

DETAILED DESCRIPTION OF THE DISCLOSURE

Referring to the representations there are shown effects of methods according to the invention. Before studying the invention in detail however it is desirable to review the nature of sinusoids in image logs, and the reasons why they can be problematic to assess.

A. Sinusoid Basics

A planar surface intersecting a cylinder describes a sine wave on the surface of the cylinder.

The cylinder may be represented (in cylindrical coordinates r, φ and z) by the equation r=R, where R is the radius of the cylinder. Thus any point on the cylinder can be represented (in Cartesian coordinates) by (R cos φ; R sin φ; z) where φ is the azimuth (angle around the cylinder) and z is the distance of the point along the cylinder axis. To obtain the intersection of a plane with the cylinder, it is necessary to solve the equation of a plane with the cylinder. A plane can be defined using the equation $$\bar{n} \cdot \bar{p} = o \quad (1)$$

where $\bar{n}=(n_x; n_y; n_z)$ the unit vector in the direction perpendicular to the plane and $\bar{p}$ is any point in space. Thus, by substituting $\bar{p}=(R \cos \phi; R \sin \phi; z)$ in equation (1) and solving for z, $$z = \frac{-Rn_x\cos\phi - Rn_y\sin\phi}{n_z} \quad (2)$$

The normal (unit vector in the direction perpendicular to the plane) $\bar{n}=(n_x; n_y; n_z)$ may be represented in spherical coordinates as $$\bar{n}=(\sin \phi_n \cos \theta_n; \sin \phi_n \sin \theta_n; \cos \phi_n) \quad (3)$$

where $\phi_n$ is the angle made by the normal $\bar{n}$ with the z-axis and $\theta_n$ is the angle between the positive x-axis and the projection of the normal onto the XY-plane.

By substituting (nx; ny; nz)=(sin $\phi_n$ cos $\theta_n$; sin $\phi_n$ sin $\theta_n$; cos $\phi_n$) in equation (2), $$z=-R \tan \phi_n \cos(\phi-\theta_n) \quad (4)$$

Figure 1:
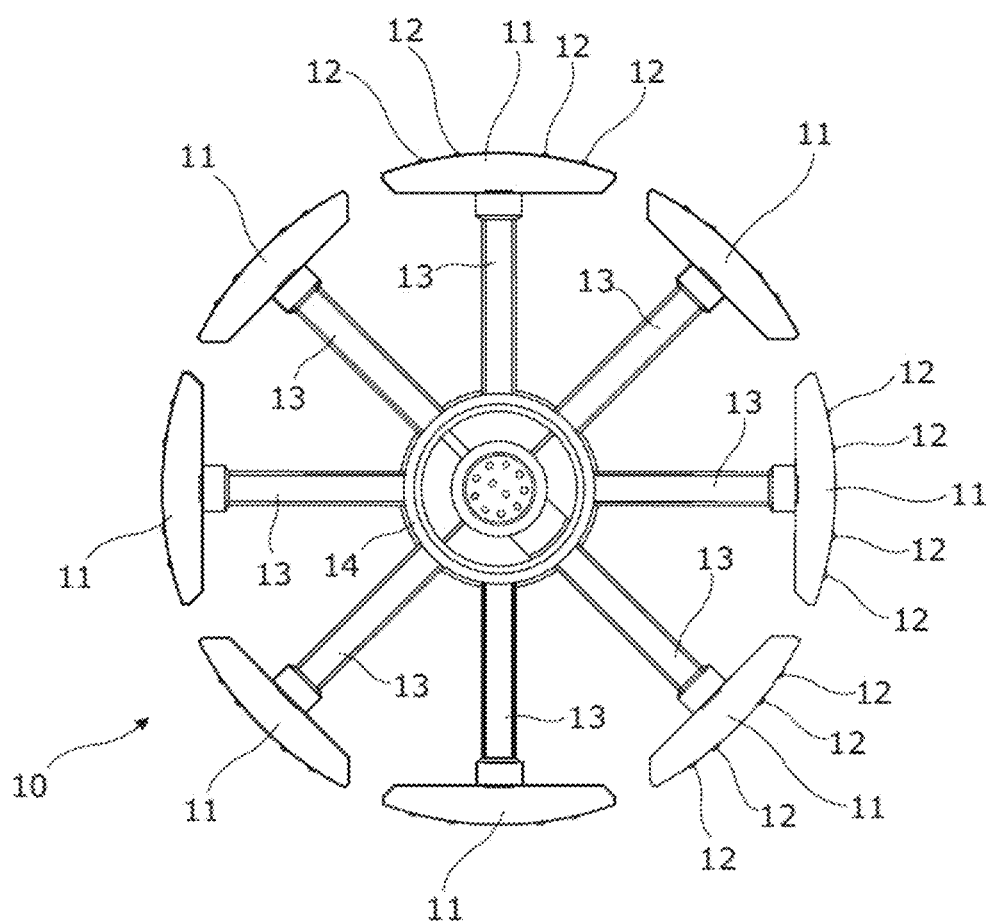
FIG. 1 is a schematic, vertically sectioned representation of part of a resistivity image logging tool.
Figure 2:
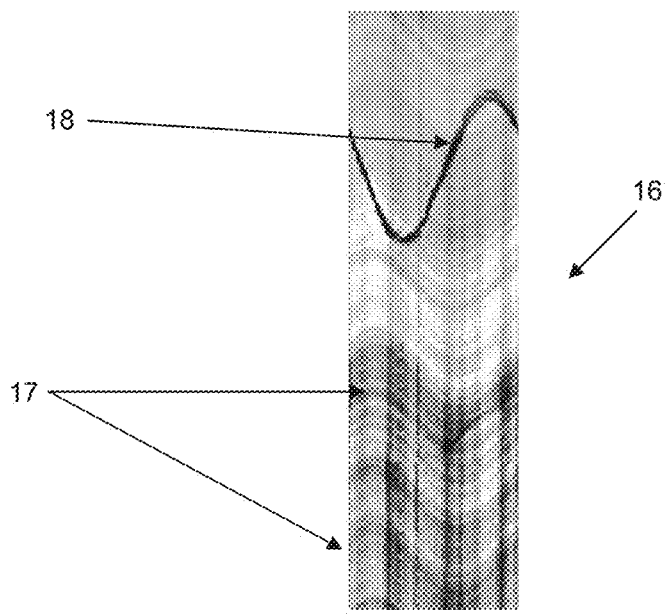
FIG. 2 is a typical image log showing how bedding and an isolated fracture commonly appear.

Thus, z has a sinusoidal curve dependence on the azimuth φ for an intersecting bedding plane. Planar features in a formation can therefore be detected as sinusoids in the image. However, such features are generally not isolated. Fractures, for example, are typically embedded in a prominent background of bedding planes. The bedding often manifests itself as stacked sinusoids with common amplitude (resulting from the bedding dip) and phase (resulting from the bedding azimuth). A strategy for detecting one is unlikely to be appropriate for the other. Fractures may be substantially less common than bedding or vice-versa, and may have a high apparent dip relative to bedding, making fractures the exceptions where bedding is the rule (and, also, vice-versa). Also, multiple (intersecting) fractures may be present. FIG. 2 shows a borehole image 16 containing bedding 17 and a single fracture 18.

Detection of these sinusoids presents several difficulties. Firstly, the images suffer a number of distortions, some of which can be identified in FIG. 2. Specifically:
- Distortions associated with variations in the speed of the tool
- The borehole is not perfectly cylindrical
- Geological boundaries are not perfectly planar
- Sinusoids may be incomplete due to:
    - Missing information due to partial coverage (that may be addressed by the aforementioned gap-filling techniques)
    - Fractures being truncated at bed boundaries.

Secondly, the presence of multiple, intersecting curves is a problem for prior art curve detection techniques such as the Radon or Hough methods. Even though the Radon transform is capable of dealing with intersecting curves, it is necessary first to obtain an edge map. This edge map must be able to represent intersecting curves, because if information is lost at this stage it cannot be retrieved at a later stage. This problem is tackled by adopting an orientation space approach. However, the parameter space computed by the Radon transform contains a large number of local maxima which do not correspond to actual sinusoidal events in the image (despite the orientation constraints). It is possible to distinguish between three types of bad picks (detected curves):
- Picks due to background noise: integration along a curve through a noisy region results in a significant value in parameter space.
- Picks due to connecting segments that belong to different fractures.
- Picks due to detecting a single fracture multiple times. For a correctly picked fracture with amplitude A, curves with slightly larger or small amplitude still give a good fit on the flanks of the sinusoid.

The inventors have found that the drawbacks of prior art curve detection techniques may be overcome by adopting novel approaches to the identification of sinusoids. The inventors furthermore have found that the success of such novel approaches may be noticeably enhanced by pre-processing the log data, or signals derived from them, as described in the following sections hereof:

B. Pre-Processing—Edge Detection

The inventors have found that good edge detection is very important if the number of false sinusoids is to be kept to a minimum. The commonly used algorithms are not suitable for this application, so two algorithms have been developed. They are: gradient and phase-based edge detection.

In the following the phase-based edge detection method is described first. In practical embodiments of the method of the invention one of the described edge detection techniques may be practiced on its own; or they may be used in combination. One effective regime the inventors have adopted involves firstly carrying out the steps of a gradient-based edge detection method; and subsequently processing the thus-treated log data using a phase congruency method. This combination has been found to give good results.

One major advantage of the phase-based approach versus the classical gradient-based approach (Sobel, Canny . . . ) is that the resulting corner and edge operator is highly localized and has responses that are invariant to image contrast. This results in reliable feature detection under a wide range of measurement contrast conditions with fixed thresholds.

C. Phase Congruency

Figure 3:
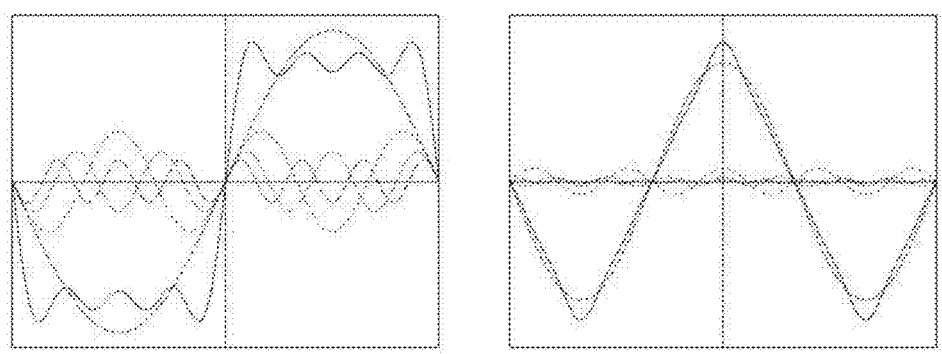
FIG. 3 illustrates the concept of phase congruency with reference to square and triangular waves.

The local energy model of feature detection postulates that features are perceived at points of maximum phase congruency[1]. For example, considering the Fourier series that makes up a square wave, all the Fourier components are sine waves that are exactly in phase at the point of the step at an angle of 0 or 180 degrees (as represented by FIG. 3 which shows the phase congruency of an (i) illustrative square wave (left hand plot) constructed from a number of sine waves and (ii) a similarly constructed triangular wave (right hand plot)) depending on whether the step is upward or downward. At all other points in the square wave phase congruency is low. Similarly, one finds that phase congruency is a maximum at the peaks of a triangular wave (at an angle of 90 or 270 deg.). Congruency of phase at any angle produces a clearly perceived feature.

Morrone & Evans[2] define the phase congruency function in terms of the Fourier series expansion of a signal at some location x as $$PC(x) = \max_{\bar{\phi}(x) \in [0,2\pi]} \frac{\sum_n A_n \cos(\phi_n(x) - \bar{\phi}(x))}{\sum_n A_n} \qquad (6)$$

where $A_n$ represents the amplitude of the nth Fourier component, and $\phi_n(x)$ represents the local phase of the Fourier component at position x. The value of $\bar{\phi}(x)$ that maximizes this equation is the amplitude weighted mean local phase angle of all the Fourier terms at the point being considered. Taking the cosine of the difference between the actual phase angle of a frequency component and this weighted mean, $\bar{\phi}(x)$, generates a quantity approximately equal to one minus half this difference squared (the Taylor expansion of $\cos(x) \approx 1 - x2/2$ for small x). Thus, finding where phase congruency is a maximum is approximately equivalent to finding where the weighted variance of local phase angles, relative to the weighted average local phase, is a minimum.

Phase congruency however may be a rather awkward quantity to calculate. As an alternative, Venkatesh and Owens[3] show that point of maximum phase congruency can be calculated equivalently by searching for peaks in the local energy function. The local energy function is defined for a one-dimensional luminance profile, I(x), as $$E(x) = \sqrt{F^2(x) + H^2(x)} \qquad (7)$$

where F(x) is the signal I(x) with its DC component removed, and H(x) is the Hilbert transform of F(x) (a 90 deg. phase shift of F(x)). Typically, approximations to the components F(x) and H(x) are obtained by convolving the signal with a quadrature pair of filters. It has been shown by Venkatesh and Owens[3] that energy is equal to phase congruency scaled by the sum of the Fourier amplitudes; that is:

$$E(x) = PC(x) \Sigma_n A_n \qquad (8)$$

Figure 4:
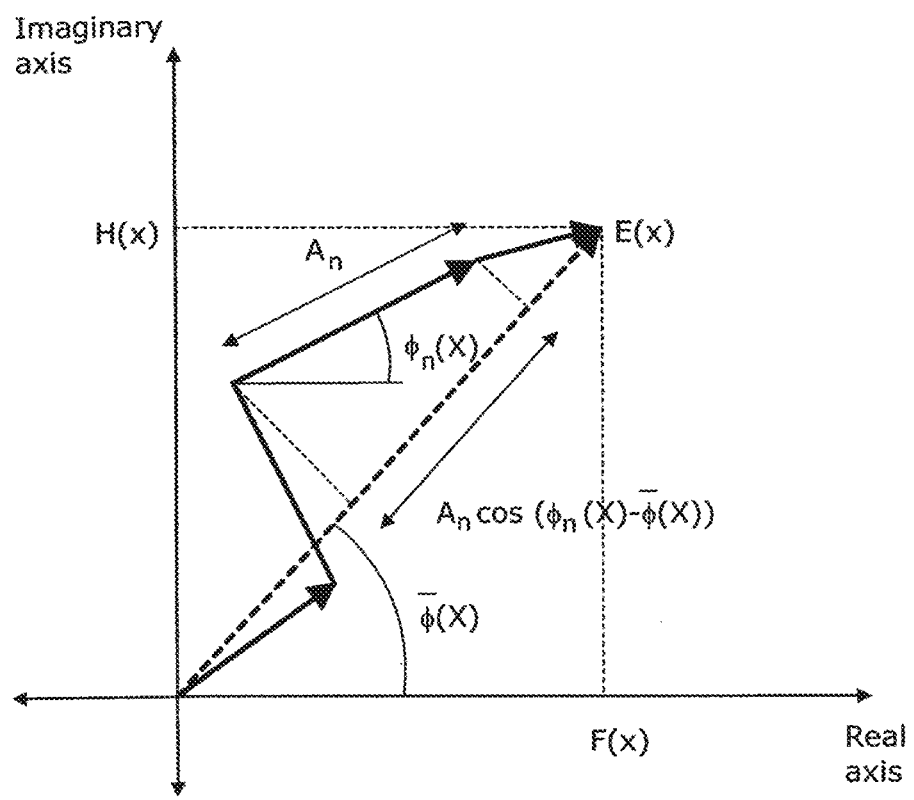
FIG. 4 is a polar diagram showing Fourier components at a location in an image log signal plotted head to tail thereby illustrating the derivation of energy, the sum of the Fourier amplitudes and the phase congruency from study of the Fourier components of the signal.

Thus, the local energy function is directly proportional to the phase congruency function, so peaks in local energy will correspond to peaks in phase congruency. The relationship between phase congruency, energy, and the sum of the Fourier amplitudes can be seen geometrically in FIG. 4. The local Fourier components are plotted as complex vectors adding head to tail. The sum of these components projected onto the real axis represents F(x), the original signal with DC component removed; and the projection onto the imaginary axis represents H(x), the Hilbert transform. The magnitude of the vector from the origin to the end point is the total energy, E(x). E(x) is equal to $\Sigma_n A_n \cos(\phi_n(x) - \bar{\phi}(x))$ Phase congruency is the ratio of E(x) to the overall path length taken by the local Fourier components in reaching the end point. Thus, it is clear that the degree of phase congruency is independent of the overall magnitude of the signal. This means that the methods of the invention provide invariance to variations in image illumination and/or contrast relative to the gradient-based techniques.

The calculation of energy from spatial filters in quadrature pairs has been central to many models of human visual perception. Also complex Gabor filters can be used to detect edges and bars in images. Prior art workers have recognized that step edges and bars have specific local phase properties that can be detected using filters in quadrature; however, in contrast to the inventive methods defined and described herein they have not connected the significance of high local energy with the concept of phase congruency.

Figure 5A:
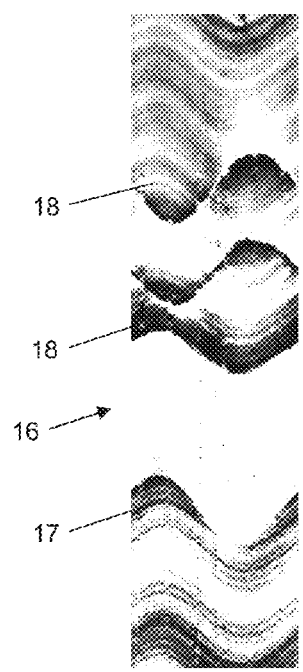
FIGS. 5a-5c show an image log and its pre-processing using a phase congruency approach, in accordance with an aspect of the invention.
Figure 5B:
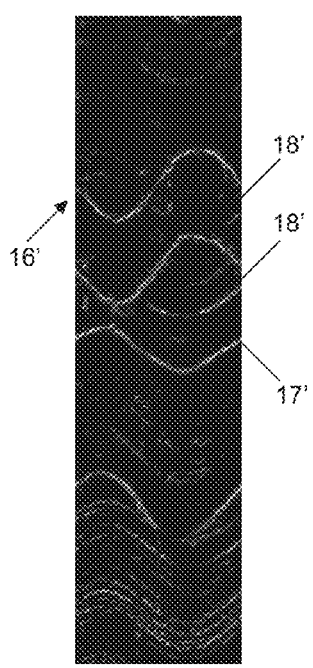
Figure 5C:
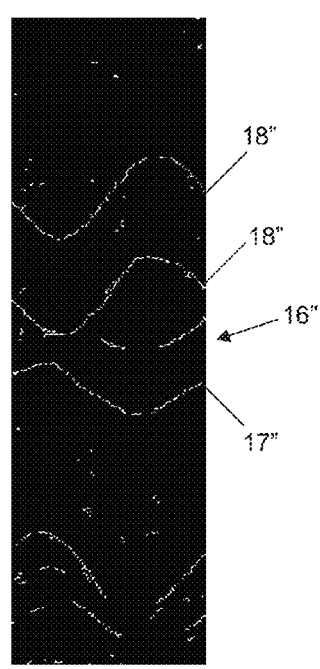
Figure 6A:
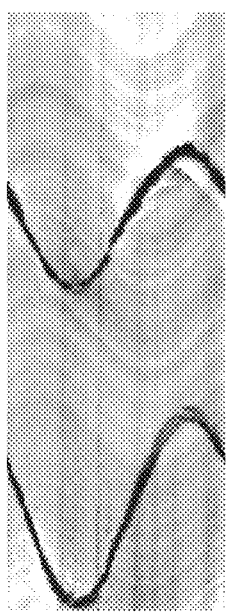
FIGS. 6a-6d show respectively an original image (FIG. 6a) and the rendering of image features at (from FIG. 6b to FIG. 6d) increasingly fine scales in accordance with an aspect of the method of the invention, and showing how certain edge features fail to give rise to disconnected edge curves at the finest levels of scale.
Figure 6B:
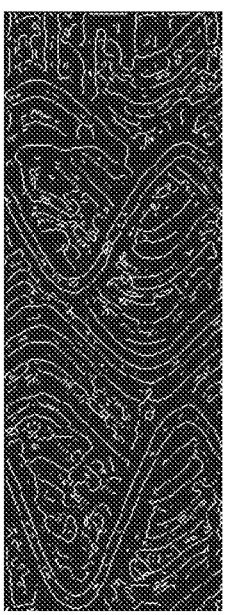
Figure 6C:
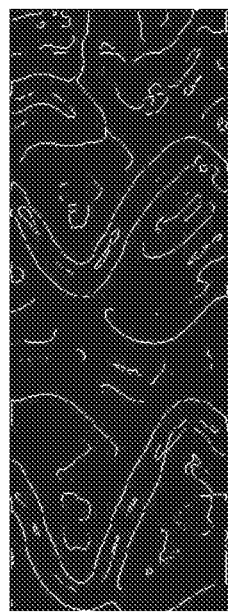
Figure 6D:
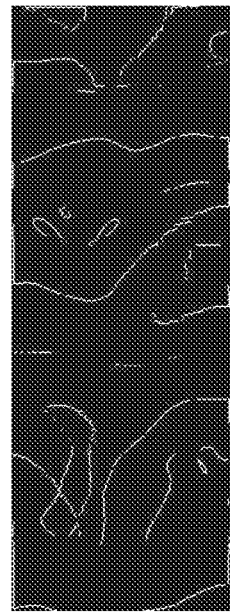

FIGS. 5a-5c illustrate the effects of phase congruency-based pre-processing of an image log.

In FIG. 5a an original borehole image 16 is similar to that of FIG. 2 and contains two fractures 18 together with bedding features 17 and a significant amount of noise, extraneous and partial features and so on.

A human who visually inspects the image of FIG. 5a can readily discern the sinusoids representing the fractures 18, but for reasons explained herein a computer encounters difficulty when seeking to perform the same task on the untreated image 16.

FIG. 5b however shows the result of a phase congruency-based approach to edge detection in accordance with an aspect of the invention as defined herein to produce a pre-processed image 16'. FIG. 5b reduces the image essentially to a binary (two contrasting color) one in which the edges 18' representing the sinusoids are much easier for a machine vision analysis program run on a computer to identify.

FIG. 5c shows a further pre-processed image log 16" on which techniques of suppression of non-local maxima and morphological structural element reconstruction, as described further herein, have been applied. For reasons explained below the edge features 18" in this version of the image are more suitable still for processing by a computer for the purpose of parameterizing the sinusoids. Similarly the most significant bedding features 17" in this image are rendered in a format that is easily detectable by a computer.

Further or alternative pre-processing of image log data in accordance with a gradient-based approach also yields improvements. Gradient-based pre-processing is described in the following sections. The inventors are the first workers to realize that such techniques may be applied successfully to image log processing.

D. Gradient-Based Edge Detection

Gradient-based edge detection is a process of identifying and locating sharp discontinuities. These discontinuities are abrupt changes in pixel intensity (amplitude rather than phase) which characterize boundaries of objects in a scene. Prior art methods of edge detection involve convolving the image with an operator (a 2-D filter), designed to be sensitive to large gradients while returning values of zero in uniform regions. Numerous edge detection operators are available, each designed to be sensitive to certain types of edges. Variables involved in the selection of an edge detection operator include:

Edge orientation: The geometry of the operator determines a characteristic direction in which it is most sensitive to edges. Operators can be optimized to look for horizontal, vertical, or diagonal edges.

Noise environment: Edge detection is difficult in noisy images, since both the noise and the edges contain high-frequency content. Attempts to reduce the noise result in blurred and distorted edges. Operators used on noisy images are typically larger in scope, so they can average enough data to discount localized noisy pixels. This results in less accurate localization of the detected edges.

Edge structure: Not all edges involve a step change in intensity. Effects such as refraction or poor focus can result in objects with boundaries defined by a gradual change in intensity. These assumptions also hold in resistivity images although they are not optical images. The operator needs to be chosen to be responsive to such a gradual change in those cases. Newer wavelet-based techniques characterize the nature of the transition for each edge in order to distinguish, for example, edges associated with one feature from those of another.

There are many ways to perform edge detection, but most may be grouped into two categories: Gradient in which the method detects the edges by looking for the maximum and minimum in the first derivative of the image and Laplacian in which method searches for zero crossings in the second derivative of the image to find edges.

E. The Lindeberg Method

One preferred method in accordance with the invention is the Lindeberg method which relies on finding edges using the differential geometric single-scale edge detector given by Lindeberg[4]. Lindeberg states that when computing descriptors of image data, the type of information that can be extracted may be strongly dependent on the scales at which the image operators are applied. In this technique the novel concept of a scale-space edge is introduced, defined as a connected set of points in scale-space at which:

1. the gradient magnitude assumes a local maximum in the gradient direction, and
2. a normalized measure of the strength of the edge response is locally maximal over scales.

An important consequence of this definition is that it allows the scale levels to vary along the edge detecting one-dimensional image features, such as edges and ridges. Actually, the choice of scale levels can affect the result of edge detection. Moreover, different scale levels will, in general, be needed in different parts of the image. Specifically, coarse scale levels are usually necessary to capture diffuse edges (due to shadows and other "illumination" phenomena). To cope with this problem, Lindeberg has proposed an extension of the notion of non-maximum suppression, with the scale dimension included already in the edge definition. It is based on the idea that in the absence of further evidence, scale levels for feature detection can be selected from the scales at which normalized measures of feature strength assume local maxima over scales. For two specific measures of edge strength, an immediate consequence of this definition is that fine scale levels will be (automatically) selected for sharp edges, and coarse scales for diffuse edges.

An example shown in FIG. 6 illustrates the concept of edge detection based on different scales, and how different types of edge structures are extracted at different scales. In addition, an edge detector based on this approach computes a diffuseness estimate at each edge point. Such attribute information constitutes an important clue to the physical nature of the edge. Another important property of this approach is that the scale levels are allowed to vary along the edge, which is essential to capture edges for which the degree of diffuseness varies along the edge.

F. Non-Local Maxima Suppression and Cleaning Edges

The two phase and gradient-based approaches may be carried out as preliminary steps of edge detection before a sinusoid detection/estimation process in completed. Smooth and continuous edges are desirable in order to establish a relationship between multiple pixels before estimating the sine waves. When the edges are fragmented, it is necessary to have a way of establishing which edges can combine together to form a sine wave. So usually, whether phase-based or gradient-based edge detection, or indeed a combination of these pre-processing methods, is completed such steps need to be followed by a non-local maxima suppression strategy. As the results from phase-based and gradient-based pre-processing are different so also the suppression of non-local maxima differs in dependence on the pre-processing method selected.

Suppression in Phase-Based Edge Detection. In the case of a phase congruency approach, after detecting the phase information from the image the following additional processes are put into effect in the following order:

- Non-local maxima suppression: consists of performing non-local maxima suppression on an image using an orientation image (the output from the phase congruency method steps defined herein). It is assumed that the orientation image gives feature normal orientation angles in degrees (0-180). This sub-algorithm uses a bi-linear interpolation to estimate intensity values at ideal, real-valued pixel locations on each side of pixels to determine if they are local maxima.
- Hysteresis thresholding: this sub-algorithm performs hysteresis thresholding of an image. All pixels with values above threshold T1 are marked as edges. All pixels that are connected to points that have been marked as edges and with values above threshold T2 are also marked as edges and eight-connectivity is used (i.e. ignoring the center pixel in a square of nine pixels).
- Morphological cleaning: consists of removing pixels on the boundaries of objects without allowing objects to break apart.

Figure 7:
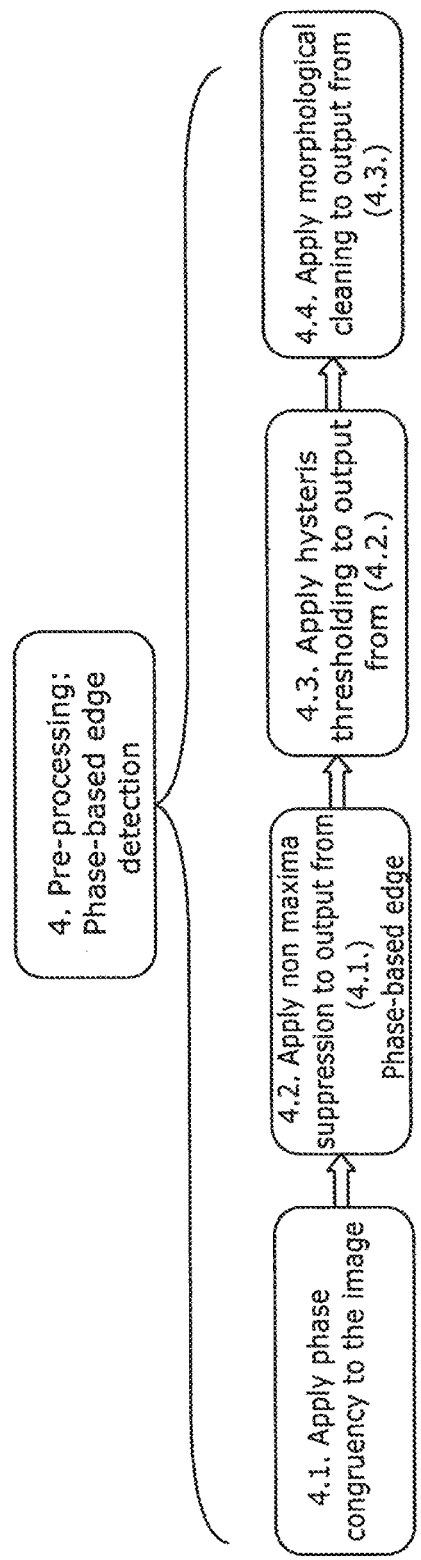
FIG. 7 is a flowchart summarizing the pre-processing steps of the method of the invention in the case of pre-processing being based on establishing phase congruency.
Figures 8A, 8B, 8C, 8D, 8E:
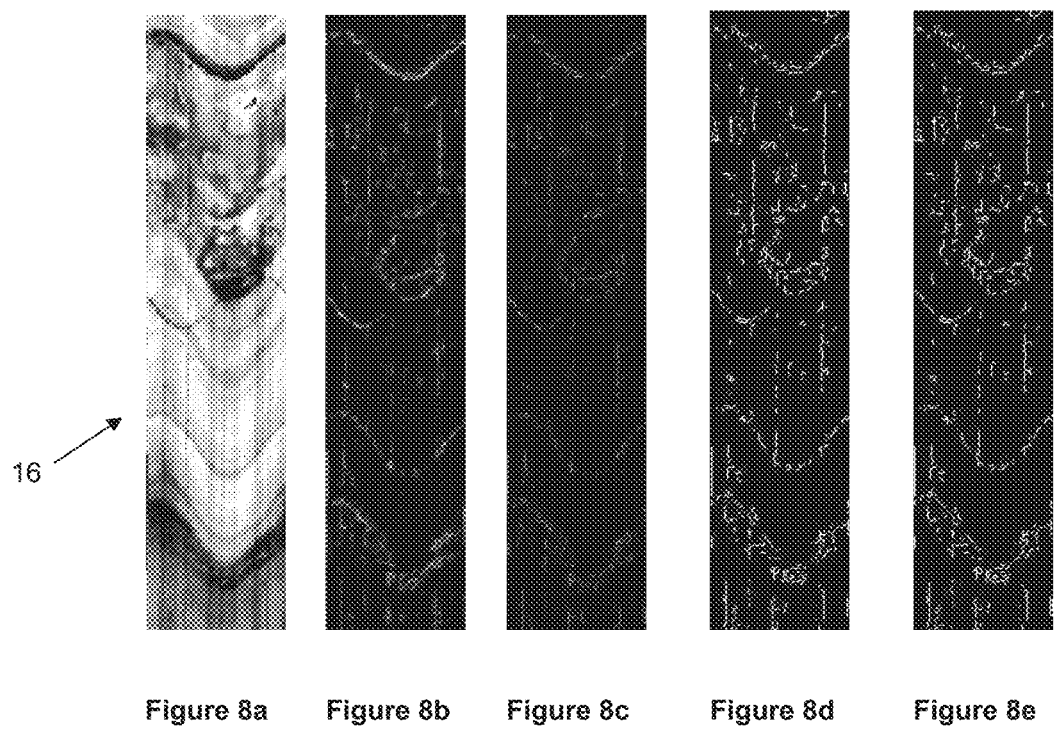
FIGS. 8a-8e show an original image log (FIG. 8a) and the effects on it of pre-processing in accordance with the steps summarized in FIG. 7.

FIG. 7 summarizes the pre-processing steps of the method of the invention in the case of a phase congruency based approach; and FIGS. 8b-8e illustrate in image logs the effects of Steps 4.1-4.4 respectively of FIG. 7 on an original image log 16 visible in FIG. 8a.

G. Suppression in Gradient-Based Edge Detection

Figure 9:
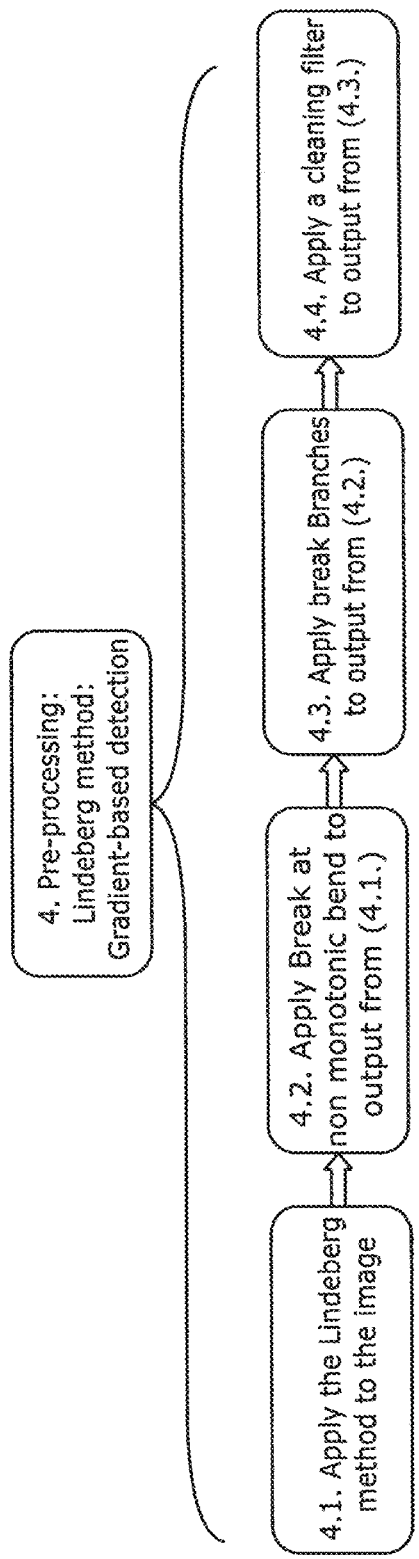
FIG. 9 is a flowchart summarizing the pre-processing steps of the method of the invention in the case of pre-processing being based on a multi-scale Lindeberg method.

In the case of gradient-based pre-processing approach using a multi-scale Lindeberg method, different steps are involved as shown in FIG. 9.

Figures 10A, 10B, 10C, 10D, 10E:
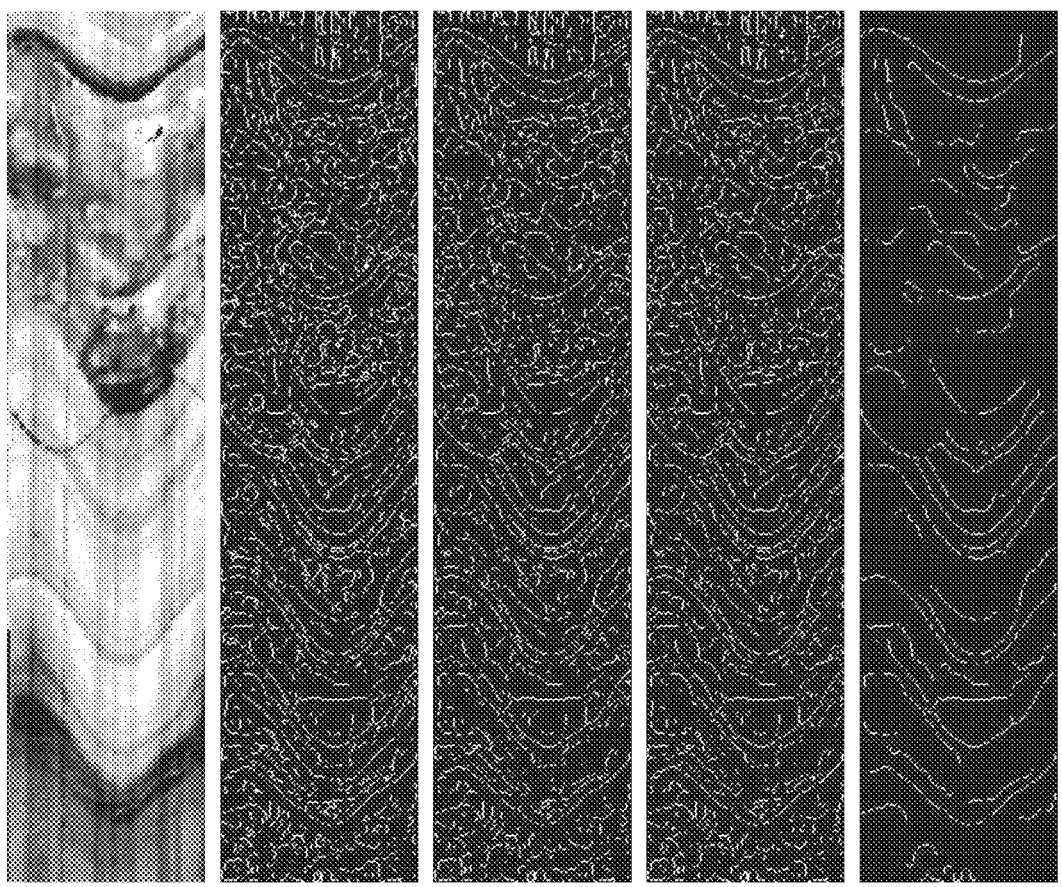
FIGS. 10a-10e show an original image log (FIG. 10a) and the effects on it of pre-processing in accordance with the steps summarized in FIG. 9.

FIGS. 10b-10e illustrate the effects of the different steps summarized in FIG. 9 on an image log 16 presented in FIG. 10a.

FIGS. 8 and 10 show that the two pre-processing approaches are different, and the steps involved before sine wave detection occurs are also different. However, for the sine wave detection aspect of the method of the invention the algorithm is the same regardless of whether a phase congruency approach or the Lindeberg method is used for edge detection.

H. Detection/Estimation of Sine Waves in Resistivity Images

This section describes the estimation (or in other words parameterization) of sine waves, which is the last step of the method of the invention. Sinusoidal features in resistivity and acoustic log images are characterized by having exactly one period and being horizontally oriented. In contrast to previous work in this area, the method of the invention processes binary edge images to detect the presence of sine waves. These images are obtained using the phase congruency and/or gradient methods described above. The simplest approach would be to perform an exhaustive search of the image by considering every possible sine wave at every possible line of the image with a suitable metric to determine which sine waves are an adequate fit. In practice, this would be computationally heavy. Hence the inventors have developed a faster, two-step technique.

The approach adopted in accordance with the invention to increase the speed of operation is to use a fast method for detecting the location of sine waves prior to any attempt to estimate the sine wave parameters. The relatively fast location method is described in the following section, after which is presented a description of the approach used for the estimation of the sine wave parameters.

I. Sine Wave Detection

The purpose of the sine wave detection step is to come up with a list of possible lines in the image which may contain a sine wave—these lines are then passed onto the next section of sine wave estimation which is more time consuming. Reducing some thresholding parameters will increase the number of lines for processing by the sine wave estimation code, and increasing it will reduce them. The reason for this first stage is simply to reduce the number of lines in the image that the more time consuming sine wave estimation stage has to process.

Figure 11:
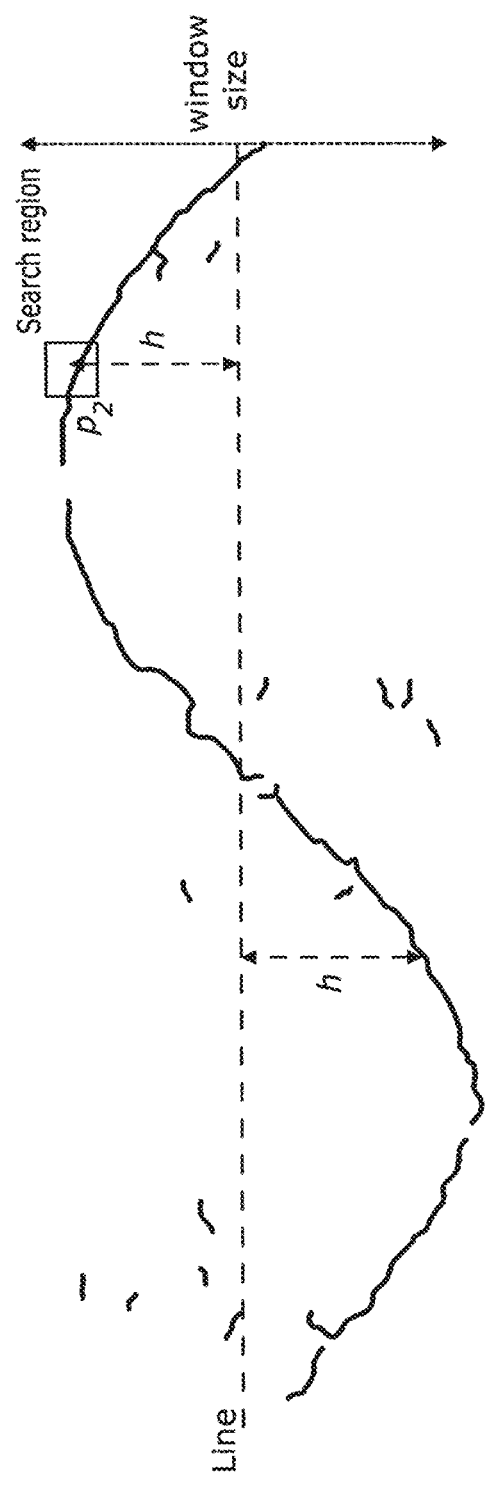
FIG. 11 is a schematic representation of an algorithm, in accordance with the invention, for detecting the presence of sinusoids in the presence of noise.

The algorithm is based upon the trigonometric identity:

$$\sin(\theta) = -\sin(\theta + \pi) \qquad (9)$$

and can be summarized as follows:
1. Process the image on a line-by-line basis.
2. At each line consider a window of pixels above and below the line. For each pixel position (p1) within this window, if this pixel position contains part of an edge, determine the position of a new point (p2) shifted horizontally by W/2 (where W is the image width) pixels and reflected vertically about the current line. This is depicted in FIG. 11. Note, the images are "cylindrical" and hence if the new x-coordinate exceeds the image width (W), then the position "wraps" around to the start of the row, i.e. we subtract W from the column.
3. A small search region centered on p2 is examined for any detected edges. A count of the number of edge pixels within this search region is added to an accumulator for this line position.
4. A simple threshold on the accumulator values can be used to decide whether a sine wave is present at this position.

The algorithm relies upon the fact that the symmetry relationship between points p1 and p2 applies to the sine wave features and in general not to edges relating to other image features. The search region is required to allow for the fact that in practice the sinusoidal features may not be perfect sine waves due to either a non-circular borehole or non-flat intersecting plane. The algorithm in its above form is seen to work well for relatively clean edge images as depicted in FIG. 10. Hence the described pre-processing steps preceding the sine wave detection are strongly desirable. Indeed in one aspect the invention resides in the combination of pre-processing, sine wave detection and sine wave estimation.

The detection problem can be addressed by considering the slope of the sine wave. The slope of a sine wave $\sin(\theta)$ is simply its derivative $\cos(\theta)$. There exists a similar trigonometric identity relating the slopes:

$$\cos(\theta) = -\cos(\theta + \pi) \quad (10)$$

Hence one may expect the local slopes at points p1 and p2 to be equal in magnitude but opposite in sign. An algorithm to estimate the local slope of edges is also adopted here. This algorithm utilizes a simple flood-fill algorithm to determine connected pixels within a specified neighborhood size and, from these pixels, estimate a least squares linear fit to estimate the local slope. The most efficient way to achieve this is to create a temporary image in which the pixel values are either a sentinel value indicating that there is no edge at that pixel position in the original image, or the local slope angle estimated from the flood-fill algorithm.

Under this new approach, step 3 of the algorithm becomes:

A small search region centered on p2 is examined for any detected edges. A count of the number of edge pixels in this search region, whose estimates of local slope are within a threshold of the negative of the slope at point p1, is added to an accumulator for the this line position.

This algorithm reduces the number of false positives, as there is a reduced likelihood of this additional symmetry constraints being found in the non-sinusoidal edge content.

The algorithm is fast and takes a fraction of a second to process an image of 2 meters, including the estimation of local slopes.

J. Sine Wave Estimation

Having determined which lines in an image are likely to contain sine waves, it remains to process these lines to estimate the sine wave parameters. A simple expression that can be used to represent the sine wave is given by:

$$y = A\sin\left(\frac{2\pi x}{W} + \phi\right) \quad (11)$$

where x and y are the image pixel position, A is the sine wave amplitude, W is the width of the image and $\phi$ is the phase angle.

The above expression can be differentiated to obtain an expression for the slope of the sine wave at a given position (x, y):

$$\frac{dy}{dx} = \frac{2\pi A}{W}\cos\left(\frac{2\pi x}{W} + \phi\right) \quad (12)$$

From (11) and (12) $\phi$ can be deduced as:

$$\phi = \tan^{-1}\left(\frac{2\pi y}{W\frac{dy}{dx}}\right) - \frac{2\pi x}{W} \quad (13)$$

Also the amplitude A can be deduced as:

$$A = \frac{y}{\sin\left(\frac{2\pi x}{W} + \phi\right)} \quad (14)$$

The algorithm can be summarized as follows:
1. Create a 2-dimensional accumulator space representing the range of considered values of A and $\phi$.
2. Visit each line in the image in which the sine wave detection algorithm has indicated that a sine wave may be present.
3. At each line consider a window of pixels above and below the line. For each pixel position (x,y) within this window that contains part of an edge, determine the local slope of this edge and hence determine estimates for $\phi$ and A from the previous equations.
4. Increment the accumulator element corresponding to the estimated values of $\phi$ and A.
5. After processing the entire window, determine the maximum value in the accumulator space and if it exceeds a suitable threshold, select the corresponding values of $\phi$ and A.

This algorithm is extremely fast and has been demonstrated to work well for synthetic images of sine wave edges in the presence of binary noise. However, the performance is significantly degraded for some of the types of sine wave features found in the resistivity data. This is partly due to features that are not properly sinusoidal or where the local edges are jagged leading to errors in the estimates of the edge slope. These effects will combine to lead to a spreading of the estimates of $\phi$ and A that leads to poor peaks in the accumulator space resulting in poor sine wave fits.

In order to compensate for these types of errors, a modified algorithm can proceed from step 5 as:
6. For each non-zero element of the accumulator space determine the corresponding values of A and $\phi$. Initialize a counter to zero.
7. Visit each pixel in the image corresponding to the sine wave specified by the current line and values of A and $\phi$.
8. Determine the slope angle of the actual sine wave at each pixel position.
9. For a small search region centered on each pixel position, increment the counter by the number of any edge pixels whose local slope angle lies within a threshold of the actual slope angle determined in step 6.

Once all pixels in the candidate sine wave have been visited, if the counter value exceeds a suitable threshold, the corresponding values for A and $\phi$ are used to define the sine wave fit.

The use of a threshold in step 9 means that any false positives from the sine wave detection process can be discounted by the estimation algorithm.

FIG. 12 illustrates the results obtained using this procedure for a real data set. An extract of this data set is shown in FIG. 12a where we can see three possible sine wave features. The results of the sine wave detection process are depicted in FIG. 12b as dotted lines overlaid on the original image representing the center lines of possible sine waves.

FIG. 12c depicts the results of the sine wave estimation process with the detected sine waves shown overlaid on the original image.

K. Examples of Sine Waves Detection in Resistivity Images

Figure 13A:
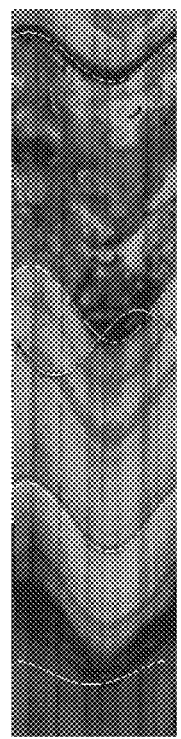
FIGS. 13a and 13b are, respectively, the results of sinusoid estimations in which the pre-processing steps are those of the phase congruency approach (FIG. 13a) and the gradient-based approach (FIG. 13b) of the invention as defined herein.
Figure 13B:
Figure 14A:
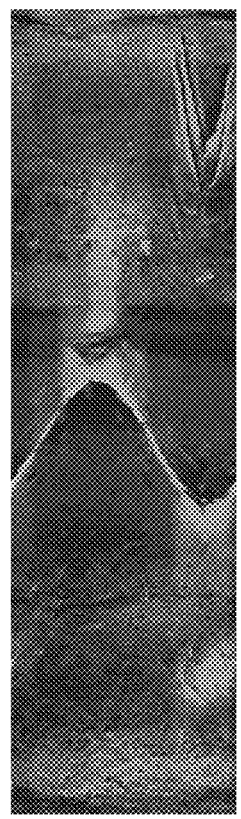
FIGS. 14a and 14b are similar to FIGS. 13a and 13b and show the output of the method of the invention when carried out on a different image log data set than used in FIGS. 13a and 13b.
Figure 14B:

FIG. 13 shows examples on a different data set using the two different approaches (phase congruency (FIG. 13a)/Lindeberg (FIG. 13b)) for sine waves detection.

In FIGS. 13a and 13b the resistivity image is given and the detected sinusoid superimposed on top of it.

Figure 15:
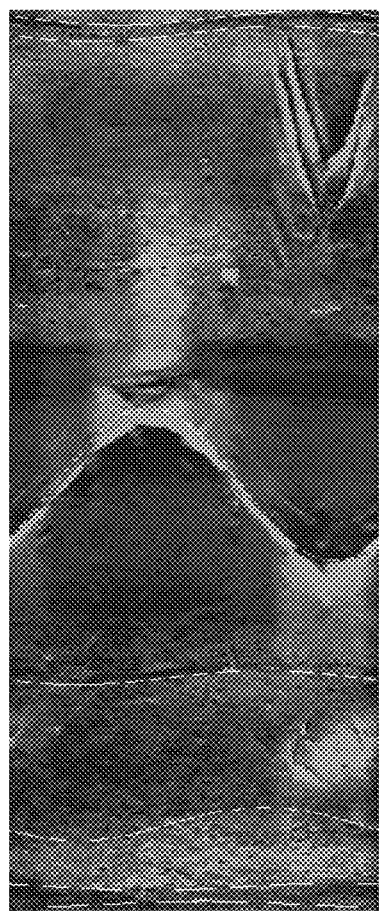
FIG. 15 shows the result of using a combined pre-processing approach, in accordance with the invention, on the data set used to generate FIGS. 14a and 14b.

Experiments completed by the inventors suggested that an approach of combining the gradient-based and phase congruency pre-processing steps may yield further improved results; and as illustrated in FIG. 15 further improvements are available by using the gradient-based approach as the primary sinusoid detection one, and then validating the detected sinusoids using the phase congruency of the original image.

Figure 16:
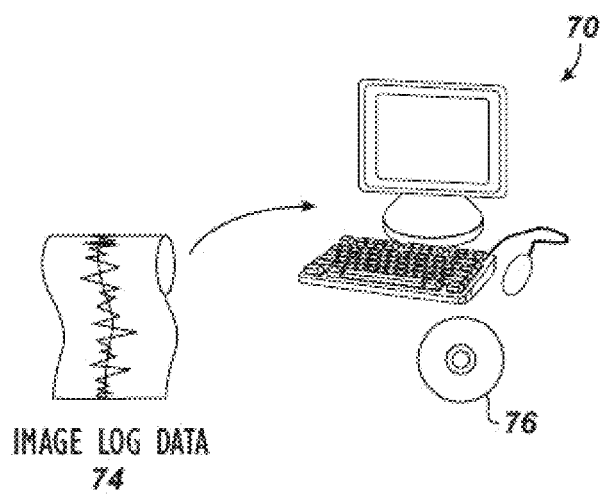
FIG. 16 is a schematic drawing showing an electronic viewing device for processing image log data and nuclear log data according to the invention.

In order to display and process, as described herein, the image log data FIG. 16 shows an electronic viewing device 70, such as a computer, that is used for viewing the image log data 74. The electronic viewing device 70 has an input device, such as mouse, keyboard, etc., that is capable of selecting one or more parts of the image log data 74 or performing other, per se known, tasks.

The viewing device 70 includes a display monitor via which a graphical user interface (GUI) according to the invention may be viewed and, in conjunction with input devices such as the mouse and keyboard, used to initiate and/or control parameters of methods in accordance with the invention. Such parameters as may be varied using the GUI of the invention include for example the fineness of scale used in the Lindeberg edge detection steps described herein; and the thresholding employed when selecting candidate lines for sinusoid parameterization.

Figure 17:
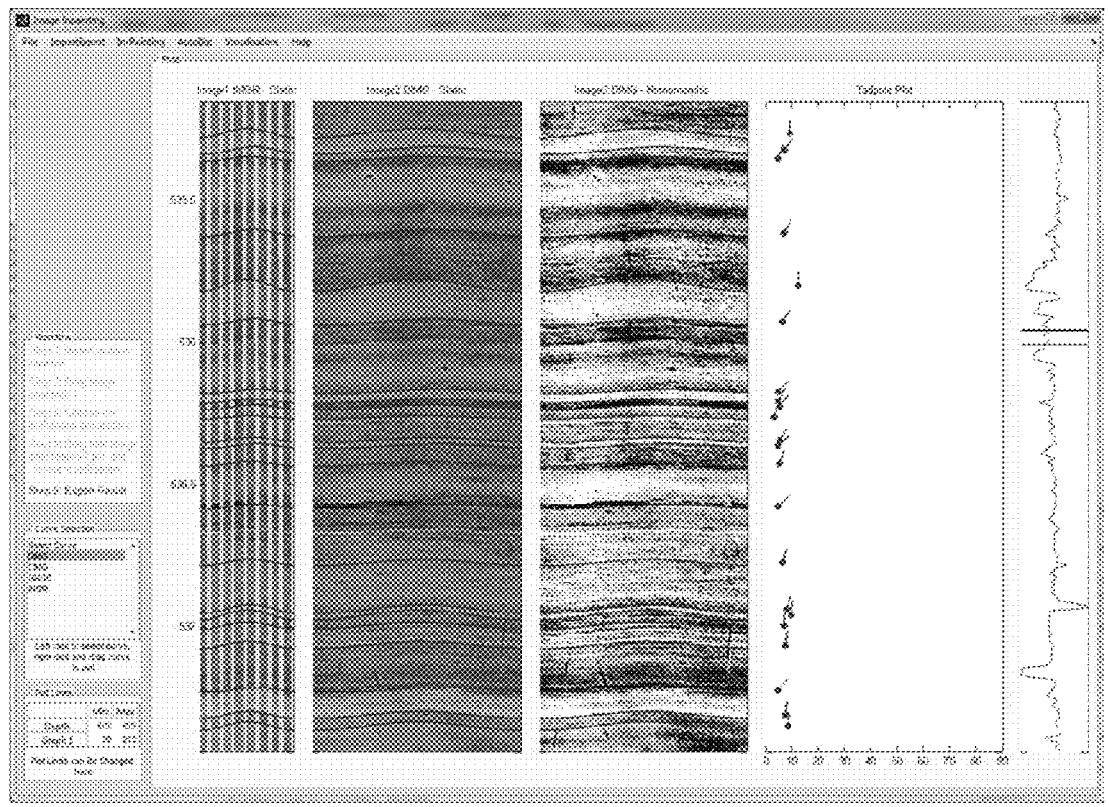
FIG. 17 is an example of a GUI that may be used to control the method steps of the invention and adjust its parameters.

An exemplary GUI in accordance with the invention is shown in FIG. 17.

Overall the method and apparatuses of the invention represent a significant step forward in the automation of the detection and estimation of sinusoids in image logs. For the first time such processes may be carried out rapidly, and using computer processing capacity acceptably economically.

The listing or discussion of an apparently prior-published document in this specification should not necessarily be taken as an acknowledgement that the document is part of the state of the art or is common general knowledge.

L. References

[1] Peter Kovesi, Image Features from Phase Congruency, Journal of Computer Vision Research, Summer 1999, Volume 1, Number 3, The MIT Press.
[2] M. C. Morrone and R. A. Owens. Feature detection from local energy. Pattern Recognition Letters, 6:303-313, 1987.
[3] S. Venkatesh and R. A. Owens. An energy feature detection scheme. In The International Conference on Image Processing, pages 553-557, Singapore, 1989.
[4] T. Lindeberg, Edge Detection and Ridge Detection with Automatic Scale Selection. International Journal of Computer Vision archive, Volume 30 issue 2, November 1998, Pages 117-156.
Further published documents of potential interest to the reader include:

D. J. Heeger, Optical flow from spatiotemporal filters. In Proceedings, $1^{st}$ International Conference on Computer Vision, pages 181-190, London, June 1987.
D. J. Heeger. Optical flow using spatiotemporal filters. International Journal of Computer Visition, 1:279-302, 1988.
D. J. Heeger. Normalization of cell responses in cat striate cortex. Visual Neuroscience, 9:181-197, 1992.
E. H. Adelson and J. R. Bergen. Spatiotemporal energy models for the perception of motion. Journal of the Optical Society of America A, 2(2): 284-299, 1985.
Z. Wang and M. Jenkin. Using complex Gabor filters to detect and localize edges and bars. In Colin Archibald and Emil Petriu (eds.).
A. Grossman. Wavelet transforms and edge detection. In S. Albeverio, P. Blachard, M. Hazewinkel, and I. Streit (eds) Stochastic Processes in Physics and Engineering, pages 149-157. D. Reidel Publishing Company, 1988.
Lim, Jae S., Two-Dimensional Signal and Image Processing, Englewood Cliffs, N.J., Prentice Hall, 1990, pp. 478-488.
T. Lindeberg. Discrete derivative approximations with scale-space properties: A basis for low-level feature extraction. J. of Mathematical Imaging and Vision, 3(4): 349-376, November 1993.
T. Lindeberg. Scale-space theory: A basic tool for analysing structures at different scales. Journal of Applied Statistics, 21(2): 225-270, 1994. Supplement Advances in Applied Statistics: Statistics and Images.

The invention claimed is:

1. A method of detecting an edge of a geological characteristic of a geological formation intersected by a borehole comprising the steps of, in respect of one or more signals obtained through operation of an image logging tool to energize the geological formation and thereby generate an image log of a length of the borehole, the one or more signals corresponding to and representing pixels of the image log, identifying locations at which the phase congruency of components of the one or more signals representative of data constituting the log or part thereof is maximal; and, in respect of such locations, characterizing them as one or more edges of geological characteristics.

2. The method according to claim 1 including generating a plurality of Fourier transforms respectively corresponding to the components; comparing phase information in the Fourier transforms corresponding to a plurality of locations in the image log; and at locations where the phase information converges or is the same, characterizing such locations as one or more edges of geological characteristics.

3. The method according to claim 2 including determining the phase congruency of the components of the said signal at a location x through operation of the Fourier series expansion function $$PC(x) = \max_{\bar{\phi}(x) \in [0, 2\pi]} \frac{\sum_n A_n \cos(\phi_n(x) - \bar{\phi}(x))}{\sum_n A_n}$$

wherein:
PC(x) is the phase congruency of the components at location x;
$A_n$ represents the amplitude of the Fourier transform of the nth component; and
φn(x) represents the local phase of the Fourier transform of the nth component at location x; and wherein the value of $\overline{\phi}(x)$ that maximises this function is the amplitude weighted mean local phase angle of all the Fourier transforms of the said components at location x, such that a locally maximal value of phase congruence occurs where the amplitude weighted variance of local phase angles, relative to the amplitude weighted local phase, is minimal.

4. The method according to claim 1 further including searching for peaks in a local luminance energy function that is proportional to phase congruency in accordance with the relation:

$$E(x)=PC(x)\Sigma_n A_n,$$

whereby to obtain a measure of phase congruency that is independent of the amplitudes of individual said Fourier transforms.

5. The method according to claim 4 wherein the local luminance energy function $E(x)$ is defined for a one-dimensional luminance profile $I(x)$ as $$E(x)=\sqrt{F^2(x)+H^2(x)}$$

wherein:
$F(x)$ is the signal $I(x)$ following removal of its DC component; and
$H(x)$ is the Hilbert transform of $F(x)$.

6. The method according to claim 5 including approximating $F(x)$ and $H(x)$ by convolving $I(x)$ with a pair of quadrature filters.

7. The method according to claim 1 including the steps of applying a break to one or more non-monotonic bends in the image log; applying break branches to the result of applying breaks; and applying a cleaning filter to the resulting data.

8. The method according to claim 1 including suppressing non-local maxima.

9. The method according to claim 8 comprising using an orientation image resulting from the steps of claim 1 to generate feature-normal orientation angles in respect of edge features; employing a bi-linear interpolation algorithm to estimate image intensity values at real-value pixel locations on either side of selected pixels of the image log in order to determine whether the selected pixels are local maxima; and if so, suppressing the selected pixels.

10. The method according to claim 8 including performing hysteresis thresholding of the image log.

11. The method according to claim 10 wherein the hysteresis thresholding includes categorizing all first pixels having values less than a threshold T1 as representing edges; and categorizing all further pixels connected to the first pixels and having values greater than a threshold T2 also as representing edges.

12. The method according to claim 11 including in respect of any square pattern of nine pixels categorized as representing edges, disregarding the value of the center pixel.

13. The method according to claim 8 including carrying out morphological cleaning of pixels by disregarding the values of pixels on the boundaries of objects based on a morphological component analysis of selected parts of the image log.

14. An apparatus including:
one or more image logging tools for obtaining one or more signals logged from a length of a borehole intersecting a formation; and
one or more programmable devices for processing the one or more signals and programmed to perform the method of claim 1.

15. The method of according to claim 1 further comprising producing log data in accordance with the method of claim 1.

16. The apparatus of claim 14, wherein the one or more programmable devices are programmed to perform the method according to claim 1 including suppressing non-local maxima.

* * * * *